US007896390B2

(12) United States Patent
Kokeguchi et al.

(10) Patent No.: US 7,896,390 B2
(45) Date of Patent: Mar. 1, 2011

(54) AIR BELT SYSTEM

(75) Inventors: Akira Kokeguchi, Tokyo (JP); Yoji Suyama, Tokyo (JP); Isao Kawase, Tokyo (JP)

(73) Assignee: Takata Corporation, Tokyo (JP)

( * ) Notice: Subject to any disclaimer, the term of this patent is extended or adjusted under 35 U.S.C. 154(b) by 1334 days.

(21) Appl. No.: 11/392,680

(22) Filed: Mar. 30, 2006

(65) Prior Publication Data
US 2006/0220361 A1 Oct. 5, 2006

Related U.S. Application Data

(60) Provisional application No. 60/667,766, filed on Apr. 4, 2005, provisional application No. 60/695,433, filed on Jul. 1, 2005.

(51) Int. Cl.
*B60R 21/18* (2006.01)
*B60R 21/237* (2006.01)

(52) U.S. Cl. .................... 280/733; 280/743.1

(58) Field of Classification Search ............. 280/733, 280/743.1; B60R 21/18, 21/237
See application file for complete search history.

(56) References Cited

U.S. PATENT DOCUMENTS

| | | | |
|---|---|---|---|
| 5,393,091 A | 2/1995 | Tanaka et al. | |
| 5,465,999 A * | 11/1995 | Tanaka et al. | 280/733 |
| 5,466,003 A | 11/1995 | Tanaka et al. | |
| 6,007,092 A * | 12/1999 | Martz | 280/733 |
| 6,082,763 A * | 7/2000 | Kokeguchi | 280/733 |
| 6,189,921 B1 | 2/2001 | Takeuchi | |
| 6,217,063 B1 | 4/2001 | Takeuchi | |
| 6,244,621 B1 | 6/2001 | Kameyoshi et al. | |
| 6,286,860 B1 * | 9/2001 | Adomeit et al. | 280/733 |
| 6,336,656 B1 | 1/2002 | Romeo | |
| 6,419,263 B1 | 7/2002 | Busgen et al. | |
| 6,439,601 B1 | 8/2002 | Iseki | |
| 6,554,313 B2 * | 4/2003 | Uchida | 280/729 |
| 6,575,201 B2 | 6/2003 | Buesgen | |
| 6,648,369 B2 | 11/2003 | Mishima et al. | |
| 6,692,020 B2 | 2/2004 | Decomps et al. | |
| 6,698,790 B2 | 3/2004 | Iseki et al. | |
| 6,705,641 B2 | 3/2004 | Schneider et al. | |
| 6,837,079 B1 | 1/2005 | Takeuchi | |
| 7,121,628 B2 | 10/2006 | Lo | |
| 7,237,799 B2 | 7/2007 | Clute | |
| 7,571,931 B2 * | 8/2009 | Watanabe | 280/733 |
| 2001/0045731 A1 | 11/2001 | Iseki | |
| 2002/0125702 A1 | 9/2002 | Ohhashi | |
| 2003/0094794 A1 * | 5/2003 | Amamori | 280/729 |

FOREIGN PATENT DOCUMENTS

EP 0 901 945 A2 3/1999

(Continued)

*Primary Examiner*—Paul N. Dickson
*Assistant Examiner*—Joselynn Y. Sliteris
(74) *Attorney, Agent, or Firm*—Foley & Lardner LLP

(57) ABSTRACT

An air belt device includes a first cover member and a second cover member connect to each other defining an interior surface having an interior cavity. An inflatable member is at least partially disposed within the interior cavity defined by the first cover member in a non-inflated state. The inflatable member is folded inward so a peripheral sewn portion is placed in a center portion of the first cover member.

18 Claims, 10 Drawing Sheets

FOREIGN PATENT DOCUMENTS

| | | |
|---|---|---|
| GB | 2 341 358 A | 3/2000 |
| JP | 6-64493 | 3/1994 |
| JP | 10-226295 | 8/1998 |
| JP | 11-189117 A * | 7/1999 |
| JP | 2001-239906 | 9/2001 |
| JP | 2002-527282 | 8/2002 |
| JP | 2003291771 A * | 10/2003 |
| JP | 2003-312439 | 11/2003 |
| WO | WO 98/51542 | 11/1998 |

* cited by examiner

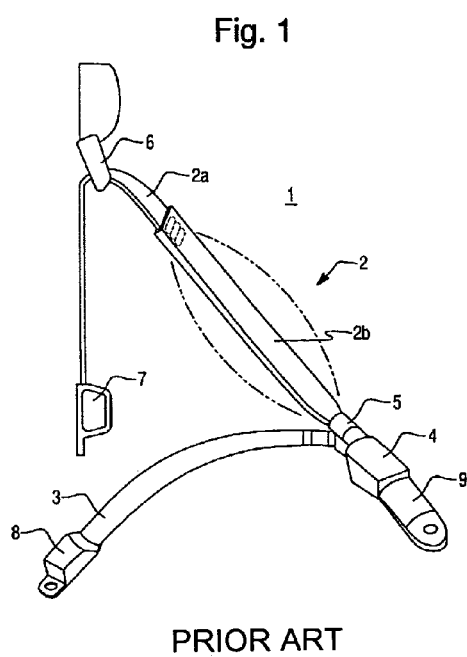
Fig. 1
PRIOR ART
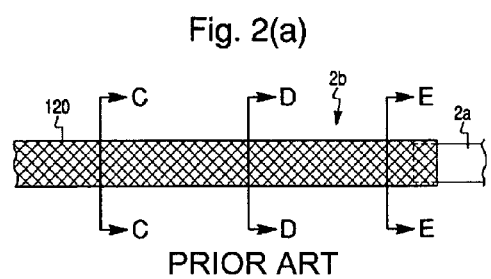
Fig. 2(a)
PRIOR ART
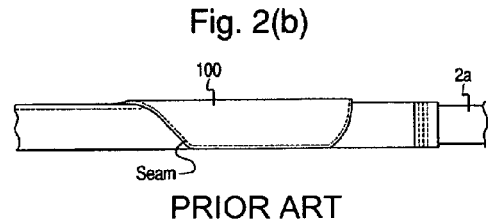
Fig. 2(b)
PRIOR ART
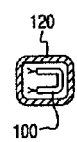 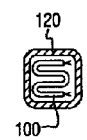 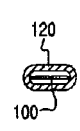
Fig. 2(c)  Fig. 2(d)  Fig. 2(e)
PRIOR ART  PRIOR ART  PRIOR ART

PRIOR ART

AIR BELT SYSTEM

This application is based upon and claims the benefit of priority from U.S. Provisional Application No. 60/667,766 filed Apr. 4, 2005 and U.S. Provisional Application No. 60/695,433 filed Jul. 1, 2005, the entire contents of which are incorporated herein by reference.

BACKGROUND

Embodiments of the present invention relate generally to safety devices and systems and in particular, embodiments of the present invention relate to an air belt device having improved folding, packaging, webbing and covering features, and an air belt system employing the same.

A conventional air belt apparatus is described in Japanese Patent Unexamined Publication No. H05-85301. FIG. 1 is a perspective view of an air belt apparatus according the publication.

As shown in FIG. 1, the air belt apparatus 1 includes a shoulder belt 2 diagonally extending from the right side of an occupant to the left side of the occupant, a lap belt 3 extending from the right side of the occupant to the left side of the occupant, a buckle device 4 disposed on, for example, a vehicle floor, a tongue 5 to be inserted into and engaged with the buckle device 4 when the occupant wears the shoulder belt 2, and a through-anchor 6 for guiding the shoulder belt 2.

The shoulder belt 2 includes a webbing 2a which is similar to a conventional and general seat belt and an air belt 2b connected to an end of the webbing 2a. The webbing 2a is slidably guided and hung-through by the through-anchor 6. The other end of the webbing 2a is connected to a seat belt retractor 7 with an emergency locking mechanism (ELR) which is fixed to the vehicle body. The webbing 2a is arranged in such a manner as to be wound into the seat belt retractor 7.

The upper end of the air belt 2b is connected to the webbing 2a by sewing or some other form of attachment and the lower end of the air belt 2b is connected to the tongue 5 for connection to the buckle device 4. The air belt 2b is positioned to be in contact with the occupant.

The lap belt 3 includes a normal belt which is the same as a typical conventional seat belt, of which one end is connected to the tongue 5 and the other end is connected to a seat belt retractor 8 with an emergency locking mechanism (ELR) which is fixed to the vehicle body. A gas generator 9 is connected to the buckle device 4 for generating high-pressure gas when required in an emergency situation such as a vehicle collision.

The tongue 5 and the buckle device 4 are provided with paths for introducing gas from the gas generator 9 to the air belt 2b.

The air belt 2b includes a large-width belt-like bag (e.g. an inflatable member) which is folded into a small-width belt-shape and is covered with a cover. The air belt 2b retains its belt-shape under normal conditions. The air belt apparatus 1 is used in a manner similar to that of a general seatbelt. When the gas generator 9 is operated upon a vehicle collision, the air belt 2b is inflated, as is shown by the dashed lines in FIG. 1, so as to protect the occupant.

In the conventional air belt apparatus 1 described above, the separate webbing 2a is required to be connected to the air belt 2b and wound around the retractor 7, because the thickness of the air belt 2b is larger than that of the webbing 2a. This causes wrinkles to be formed on the contact surface with the through-anchor 6 and the air belt 2b. As a result, the air belt 2b is difficult to be passed through the through-anchor 6 and also difficult to be wound around the retractor 7. An added problem which makes the air belt 2b so difficult to pass through the through-anchor 6 and causes the air belt 2b to have a bumpy surface is the manner in which inflatable member is folded and stored.

FIG. 2(a) is a plan view showing a portion around a joint between the webbing 2a and the air belt 2b. FIG. 2(b) is a plan view of the inflatable member, and FIGS. 2(c), (d) and (e) are sectional views taken along lines C-C, D-D, and E-E in FIG. 2(a), respectively.

As shown in FIGS. 2(a), (c), (d) and (e) the air belt 2b includes the inflatable member 100 and a knit cover 120 made of woven fabric and surrounding the inflatable member 100. The inflatable member 100 is formed in such a configuration that a portion confronting the chest and abdomen of an occupant in a seat has a larger area. The portion with larger area is folded to be in a band-like configuration as shown in FIGS. 2(b), 2(c) and 2(d).

As illustrated in FIGS. 2(c) and (d), the inflatable member 100 is folded in such a manner that the edges of the sewn portions face outward toward the knit cover 120. These outward peripheral sewn portions are unsightly as they make the air belt 2b appear bumpy and also hamper the air belt 2b from passing through the through-anchor 6. In addition, the length of the overall air belt 2b is increased by having the edges of the sewn portions folded outward. Further, with the sewn portions facing outward toward the knit cover 120 it is very difficult to control the direction of the inflatable member 100 when deployed.

Therefore, it is desired to have an air belt system such that the smoothness to the touch of the air belt is improved, the overall length of the air belt is shortened, the air belt can pass through the through-anchor easily and the direction of the air belt can be controlled during deployment.

SUMMARY

Various disclosed embodiments address the problems described above and relate to an air belt system having an inflatable member folded and stored in a manner that the air belt device is smooth, the length is reduced and it can pass through a through anchor easily. The air belt device includes a first cover member and a second cover member connected to each other defining an interior surface having an interior cavity. An inflatable member is at least partially disposed within the interior cavity defined by the first cover member in a non-inflated state. The inflatable member is folded inward so a peripheral sewn portion is placed in a center portion of the first cover member.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1 is a structural representation of a conventional air belt apparatus.

FIGS. 2(a)-2(e) are structural views of a conventional shoulder belt.

DETAILED DESCRIPTION

Figure 3A:
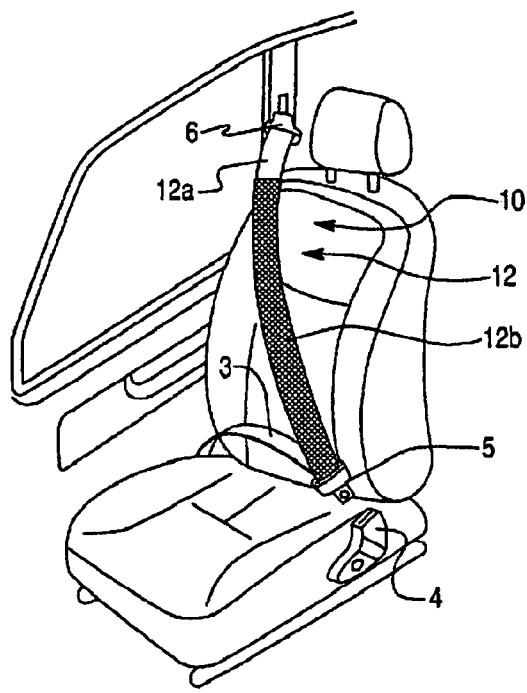
FIG. 3(a) is a perspective view of a seat on which an air belt apparatus according to an embodiment of the present invention is installed and FIG. 3(b) is a perspective view of the air belt apparatus according to an embodiment of the present invention.

Exemplary embodiments will be discussed below with reference to the drawing figures. In the figures, where possible, like reference numerals are utilized to designate like components through the views of various disclosed exemplary embodiments.

Figure 3B:
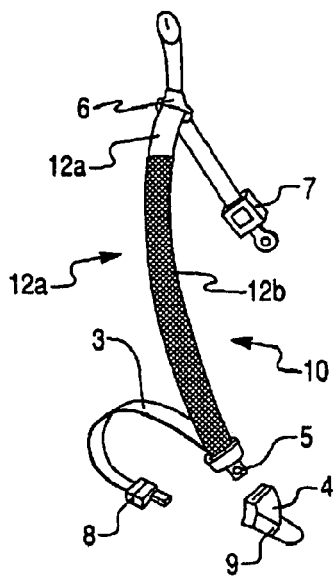

FIG. 3(a) is a perspective view of an interior of a vehicle in which an air belt apparatus according to one embodiment of the present invention is installed and FIG. 3(b) is a perspective view of the air belt apparatus. As illustrated in FIGS. 3(a) and (b), the air bag system 10 includes a shoulder belt 12. The shoulder belt 12 includes a webbing 12a and an air belt 12b. The air belt 12b includes an inflatable member 11 (shown in FIGS. 5(a) and (b)) which is folded and covered with a cover. The air belt 12b is arranged along an occupant, who is sitting on a seat, extending from a breast to belly of the occupant so as to face the occupant. An end of the inflatable member 11, as well as an end of the shoulder belt 12, is connected to the tongue 5.

The inflatable member 11 is folded along crease lines extending in the longitudinal direction of the air belt 12b at the required number of times so as to become a slender folded structure having approximately the same width as that of the inflating air belt 12b. By way of example only, and not a limitation, the inflatable member 11 is folded in a band configuration. Alternatively, and not a limitation, the inflatable member 11 is folded in an accordion configuration.

The non-inflating webbing 12a of the shoulder belt 12 is inserted into the through-anchor 6 and is connected to the retractor 7 so as to enable to be wound up around and pulled out of the retractor 7. In another embodiment, a portion of the air belt 12b with a narrower width than the rest of the air belt 12b can be inserted into the through-anchor 6 along with the non-inflating webbing 12a.

According to one embodiment of the present invention, the air belt system 10 configured as above is installed in a vehicle by inserting the non-inflating webbing 12a of the shoulder belt 12 through the through-anchor 6. The non-inflating webbing 12a, just like the conventional webbing, smoothly slides relative to the through-anchor 6 while being smoothly wound around or pulled out of the retractor 7.

In the air belt system 10 according to one embodiment of the present invention, when the gas generator 9 is operated in the state that the tongue 5 is mounted on the buckle device 4, as shown in FIG. 3(b), the inflatable member 11 within the air belt 12b is inflated. At this time, the longitudinal length of the shoulder belt 12 is reduced so that the air belt 12b sticks to an occupant, enabling the occupant to be very securely protected. That is, as described above, the shoulder belt 12 hardly extends in the longitudinal direction due to the thermo-stretching. When the inflatable member 11 is inflated, the stitching of the shoulder belt 12 is laterally expanded, resulting in reduction in the longitudinal length of the shoulder belt 12 so as to reduce the longitudinal length of the air belt 12b.

According to an embodiment of the present invention as described above, the air belt 12b passes through the through-anchor 6. However, when the retractor 7 is arranged within a pillar or a seat back, the air belt 12b is inserted through an air belt insertion hole arranged in the upper part of the pillar or the seat back.

Figure 4A:
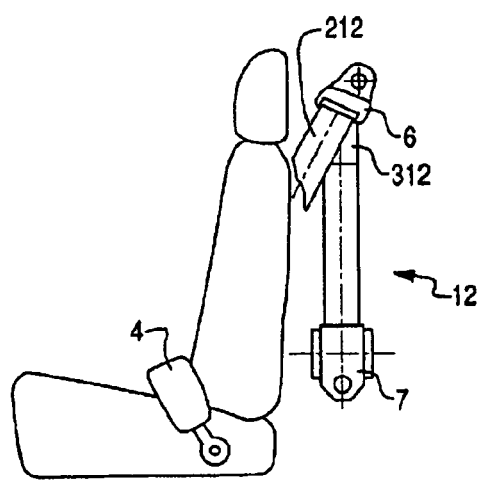
FIG. 4(a) is a side view of the shoulder belt with the webbing completely retracted according to an embodiment of the present invention and FIGS. 4(b) and 4(c) are structural views of the shoulder belt in the retracted and unretracted states respectively.

FIG. 4(a) is a side view of the shoulder belt 12 with the webbing 12a (not shown) completely retracted according to an embodiment of the present invention. As illustrated in FIG. 4(a), the air belt includes a first cover member 212 and a second cover member 312. Through-anchor 6 is positioned between first cover member 212 and second cover member 312. Therefore, the webbing 12a of shoulder belt 12 is completely in a retracted state.

Figure 4B:
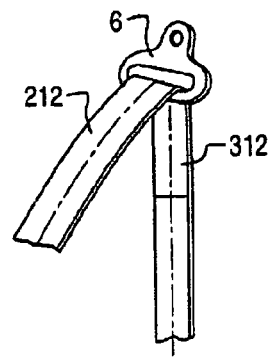
Figure 4C:
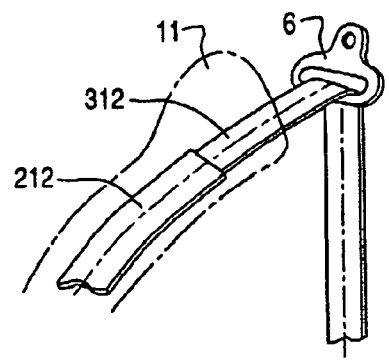

FIGS. 4(b) and (c) show an embodiment of the shoulder belt, which can be retracted when not in use and extended when in use, and thus show how the shoulder belt can provide a large area of protection while still being able to have the belt smoothly retracted. FIG. 4(b) shows that the first cover member 212 is wider than the second cover member 312. Both the first and second cover members cover the webbing. The webbing has a mesh structure that is hollow and can elongate in the radial direction. In this embodiment, the inflatable member 11 is placed in a portion of the mesh structure such that, before the inflatable member is deployed, for example, during a crash event, there is a portion of the mesh structure that houses the inflatable member 11 and a portion of the mesh structure that does not house the inflatable member 11. The first and second cover members 212 and 312 cover the mesh structure, as seen in FIGS. 4(b) and 4(c). For example, the first cover member 212 can cover the mesh structure that houses the inflatable member 11 before deployment while the second cover member 312 can cover the mesh structure that does not house the inflatable member before deployment. The inflatable member 11 is folded in the mesh structure such that its width is shorter than the width of the mesh structure in which it is placed. The portion of the mesh structure that does not house the inflatable member before deployment is so dimensioned as to be able to pass through the through-anchor 6, as seen in FIG. 4(b). Upon deployment of the inflatable member, for example during a crash event, the inflatable member 11 deploys into the mesh structure such that is expands the portion of the mesh structure in which it is housed and the portion of the mesh structure in which it is not housed, as shown in the phantom lines of FIG. 4(c).

With this kind of configuration, before an occupant puts on the shoulder belt, the shoulder belt can be retracted as indicated by the second cover member 312 being placed on one side of the through-anchor 6 and the first cover member 212 being placed on the other side as seen in FIG. 4(b). When the occupant puts on the shoulder belt, the second cover member 312 smoothly passes through the through-anchor 6 since it has a width that can be accommodated by the through anchor 6. The first and second cover members 212 and 312 cover the mesh structure of the webbing and the inflatable member 11 is configured to deploy in the mesh structure covered by the first and second cover members 212 and 312. As a result, the shoulder belt can be retracted while still providing a large area for the inflatable member 11 to deploy. Thus, this embodiment of the air belt device may comprise: a webbing having a mesh structure (hollow and elongating in a radial direction); an inflatable member accommodated in the mesh structure and configured to develop or deploy in the mesh structure; and at least one cover for protecting a section of the mesh structure. For this embodiment, before the inflatable member develops, it is folded such that its width is shorter than the width of the portion of the mesh structure in which it is housed and the portion of the mesh structure in which the inflatable member is not present passes through the shoulder anchor.

Figure 5A:
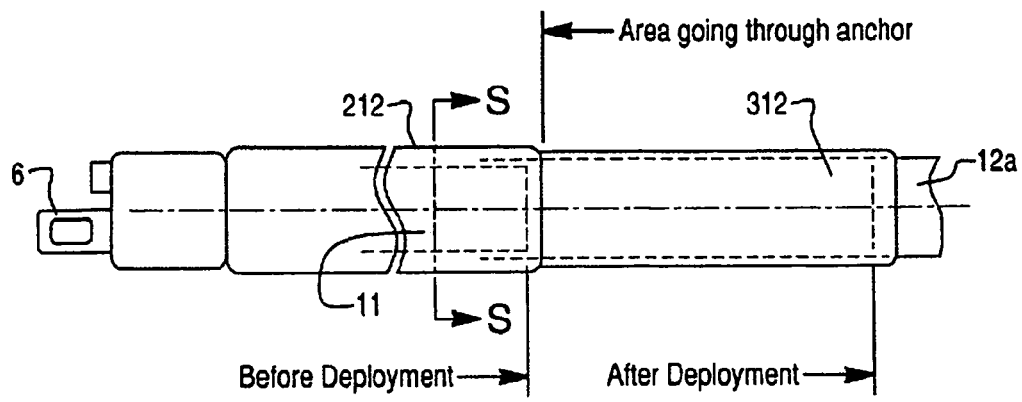
FIGS. 5(a), 5(b) and 5(d) are structural views of the shoulder belt in a non-inflated state
Figure 5B:
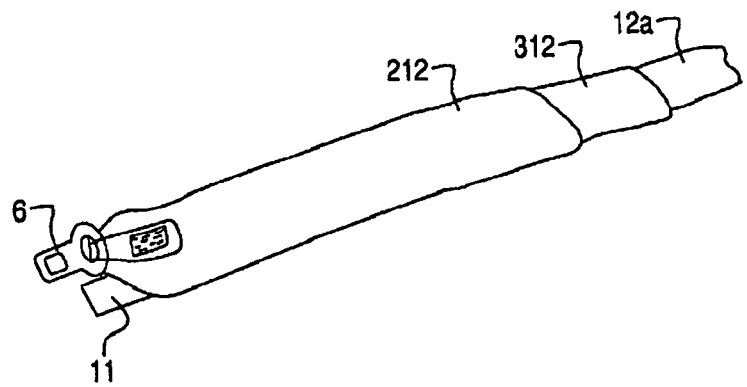
Figure 5C:
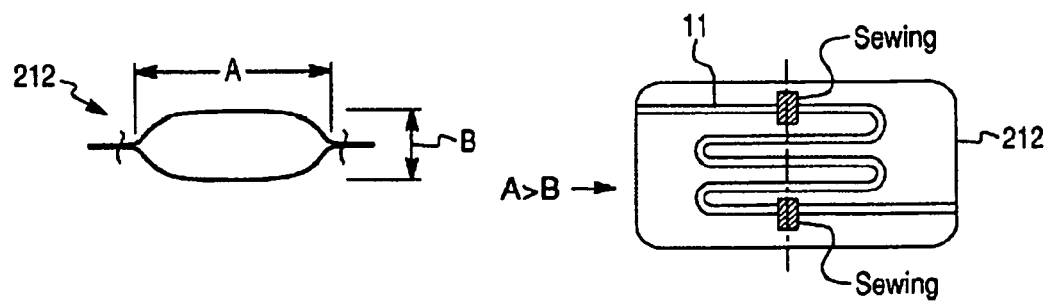
FIG. 5(c) is a cross-sectional view of the air belt according to an embodiment of the present invention.
Figure 5D:
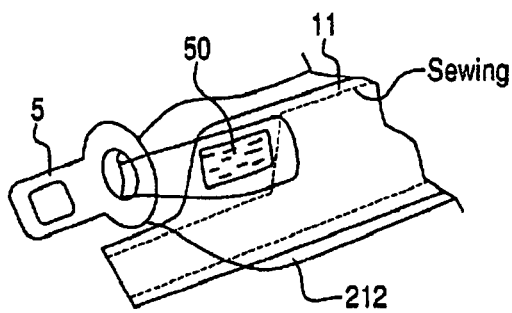

FIGS. 5(a), 5(b) and 5(d) are structural views of the shoulder belt 12 in a non-inflated state and FIG. 5(c) is a cross-sectional view of the air belt 12b taken along the line S-S in FIG. 5(a) according to an embodiment of the present invention. As stated above, the air belt 12b includes first cover member 212 and second cover member 312. By way of example only, and not a limitation, first cover member 212 and second cover member 312 includes a mesh webbing for enclosing the inflatable member 11. The mesh webbing is flexibly expandable widthwise but can hardly stretch in the direction of the length. As illustrated in FIG. 5(a), first cover member 212 is connected to the second cover member 312 by a fastening technique such [[a]] as sewing. As illustrated in FIG. 5(d), the inflatable member 11 and the mesh webbing of the first cover member 212 are connected to each other by being sewn (shown as reference numeral 50) to splice as one set at the same time. Connecting the inflatable member 11 and the mesh webbing of the first cover member 212 better controls the air belt 12b during deployment. As best illustrated in FIG. 5(c), the first cover member 212 and the second cover member 312 define an interior cavity wherein the inflatable member 11 is provided.

As illustrated in FIG. 5(a), it is contemplated that first cover member 212 is on one side of through-anchor 6 and second cover member 312 is on the other side of through-anchor 6. In this state, the inflatable member 11 may be disposed, or at least partially disposed, within the interior cavity of the first cover member 212. Referring back to FIG. 5(c), inflatable member 11 is folded in the manner shown with the edges of the inflatable member 11 folded inward so that peripheral sewn portion is placed in the center of the first cover member 212. As illustrated on the left side of FIG. 5(c), the inflatable member 11 is generally aligned inside the first cover member 212 such that the width, which is designated by the letter A, is greater than the length, which is designated by the letter B. With the peripheral sewn portion placed into the center of the first cover member 212, the direction of the air belt 12b is better controlled. Besides sewing, the edges of inflatable member 11 may be attached by crimping, clamping, or various other types of fastening devices or techniques.

Figure 6A:
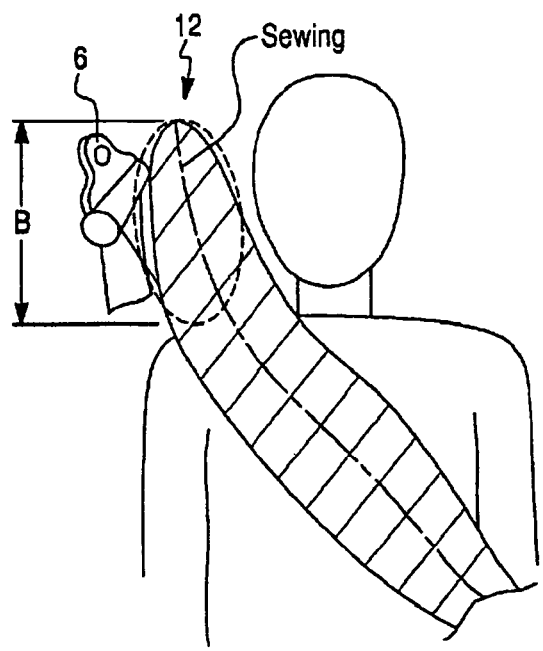
FIGS. 6(a) and 6(b) are structural views illustrating the air belt deployed when an occupant is in the vehicle according to an embodiment of the present invention and FIG. 6(c) is a schematic view of the air belt with possible inclinations toward and away from the occupant.
Figure 6B:
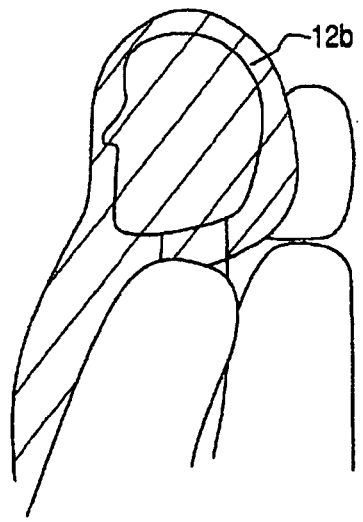
Figure 6C:
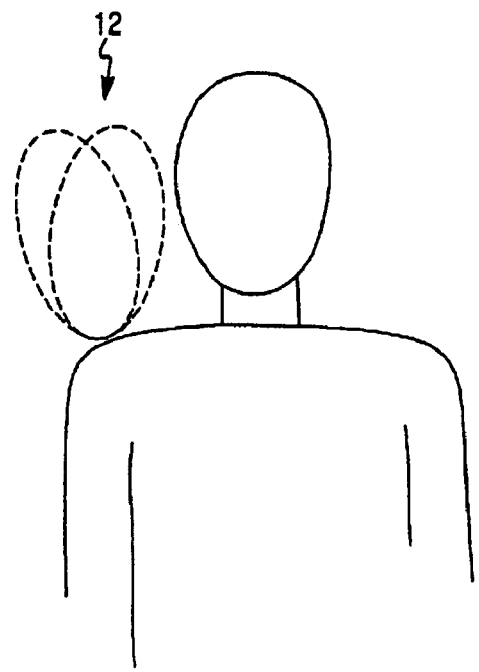

According to an embodiment of the present invention, as illustrated in FIGS. 6(a) and (b), when the edges of the inflatable member 11 are folded inward such that the peripheral sewn portion is placed in the center, more of the occupant's face is protected by the air belt 12b when the air belt 12b is deployed. FIG. 6(a) also shows how a greater width A, as presented in FIG. 5(c), would provide better protection to the occupant since the width A inflates and expands upward from the occupant's shoulder. In addition, FIG. 6(c) schematically shows that the position of a stitched portion can control the inclination of the bag so that an optimum position can be obtained for maximum protection. For example, the stitched portion, which can include the peripheral sewn portion, can be so configured as to cause the inflatable member to lean towards the head of the occupant by using a pattern of stitching on the cover member 212 or the inflatable member 11 that directs the deployment of the inflatable member toward the occupant's head so that one end of the air belt is closer to the occupant's head than the other end, as depicted in FIG. 6(c). Conversely, a pattern of stitching can be used on the cover member 212 or the inflatable member 11 that directs the deployment of the inflatable member away from the occupant's head so that one end of the air belt is farther away from the occupant's head than the other end.

The inflatable member 11 may be constructed using materials, fabrics, and techniques known to those skilled in the art for the construction of airbags. For instance, the inflatable member 11 may be made from a porous material allowing for rapid deflation following inflation. Also, various types of folds besides the band or accordion fold may be used to position the inflatable member 11 within the interior cavity of the first cover member 212 and the second cover member 312.

Figure 8A:
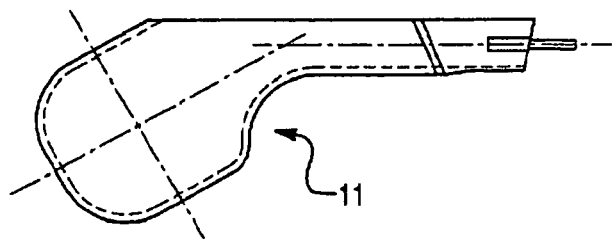
FIGS. 8(a)-8(h) illustrate various folding techniques of the inflatable member according to an embodiment of the present invention.
Figure 8B:
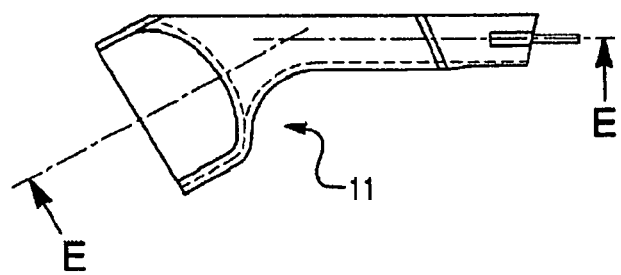
Figure 8C:
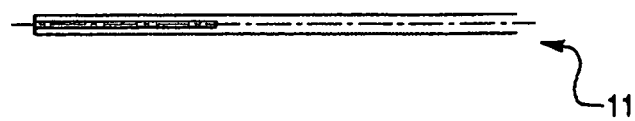
Figure 8D:
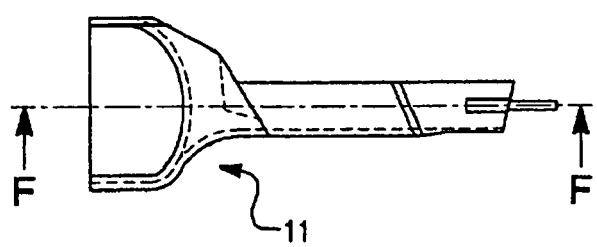
Figure 8E:

Each type of fold results in a different type of deployment. By way of example only, and not a limitation, FIGS. 8(a)-(h) illustrate various folding techniques for the inflatable member 11. As shown in FIGS. 8(b) and 8(c), the distal end of inflatable member 11 is folded inward to reduce the length of the air belt 12b. Two pieces of the base fabric of the inflatable member 11 are folded at one time instead of one piece at a time. As illustrated in FIG. 8(b), this inflatable member is not symmetrical and tends not to be deployed as intended. By folding the asymmetrical inflatable member of FIG. 8(b) as illustrated in FIGS. 8(d) and 8(e), allows for the asymmetrical inflatable member to be adapt to deploy the air belt 12b into a desired shape.

Figure 8F:
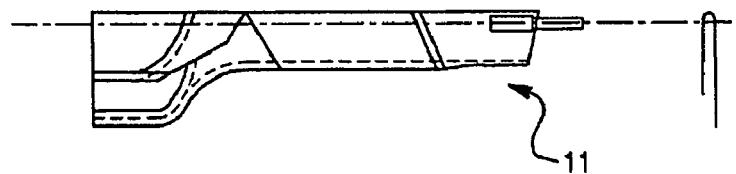
Figure 8G:
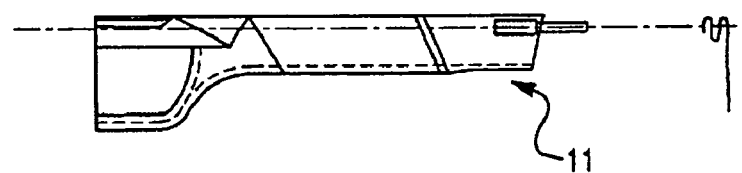
Figure 8H:
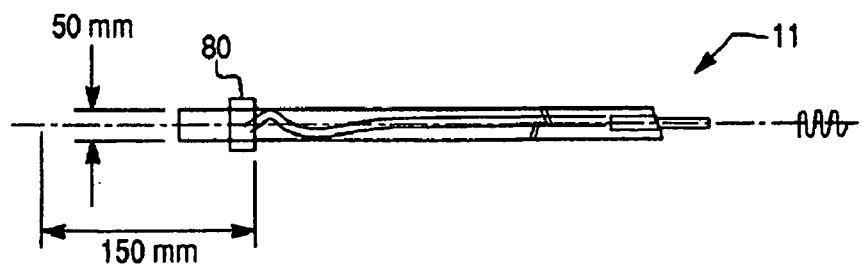

FIGS. 8(f)-8(h) illustrate the folding technique of the inflatable member 11 when an adhesive member 80 is provided to control the deployment of the inflatable member 11. The adhesive member 80 can be used every 100 mm, for example, as illustrated and at least the adhesive member 80 can be used within 150 mm, for example, from the distal end of the unfolded inflatable member 11. The incorporation of the adhesive member 80 not only holds the inflatable member 11 in position, but also reduces the overall size of the inflatable member 11, which also decreases the size of the air belt 12b. As described above, the various techniques disclosed for folding the inflatable member 11 are used to maintain the shape of the inflatable member 11 so as to better control the deployment of the air belt 12b.

Figure 7A:
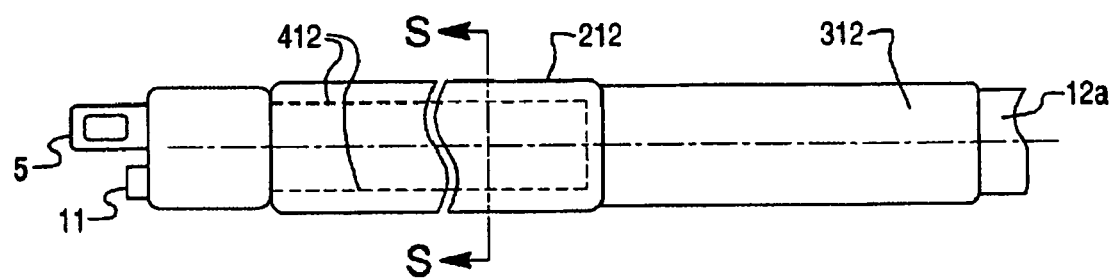
FIGS. 7(a) and 7(d) are structural views of the shoulder belt in a non-inflated state and FIGS. 7(b) and 7(c) are cross-sectional views of the first cover member according to an embodiment of the present invention.
Figure 7B:
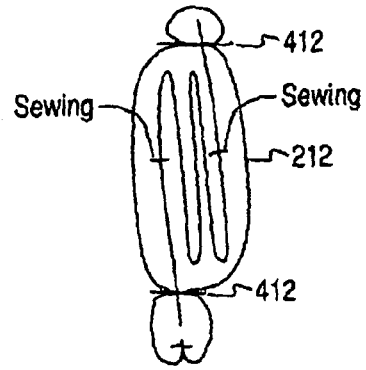
Figure 7C:
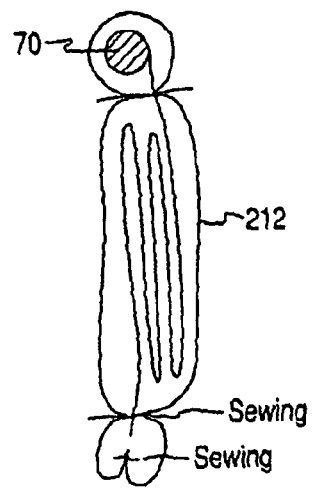
Figure 7D:
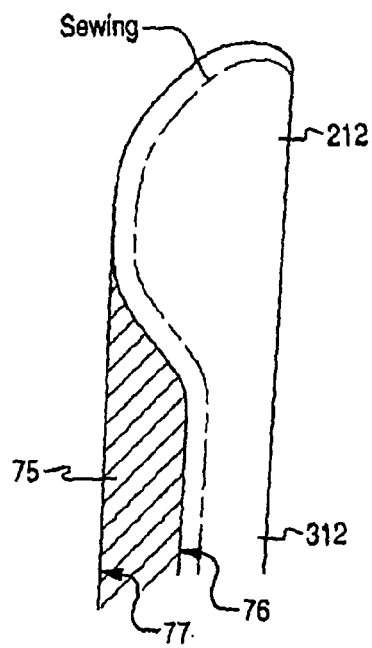

FIGS. 7(a) and 7(d) are structural views of the shoulder belt 12 in a non-inflated state and FIGS. 7(b) and 7(c) are cross-sectional views of the first cover member 212 taken along the line S-S according to an embodiment of the present invention. As illustrated in FIG. 7(a), the shoulder belt 12 may also include tear seams 412 provided on the outside of first cover member 212. These tear seams 412 are provided such that they rupture upon inflation of the inflatable member 11 disposed within the interior cavity of the first cover member 212. In an alternative embodiment, tear seams 412 may be extended partially or completely on second cover member 312. The tear seams 412 may involve sewing, crimping, clamping, or various other types of fastening devices or techniques. The strength of the tear seams 412 may vary depending on the fastening technique used. The tear seams 412, when broken, enable the inflatable member 11 to properly expand and provide protection to an occupant of a vehicle. The tear seams 412 are provided so as to prevent parts of the air belt 12b from being shifted or being rolled over. The tear seams 412 also provide the shoulder belt 12 with a good appearance and provide the occupant with comfort when wearing the shoulder belt 12.

According to the illustrated embodiments shown in the cross sectional views of FIGS. 7(b) and 7(c), the tear seams 412 are provided on edges of the first cover member 212. As shown in FIG. 7(b), the fabric of the inflatable member 11 may be extended to equalize the thickness of the air belt 12b after folding, which gives the air belt 12b a good overall appearance. As an alternative embodiment which is best illustrated in FIG. 7(c), an edge of the inflatable member 11 is filled with a sponge material 70 to provide a symmetrical shape for the inflatable member 11 and to provide the air belt 12b with a good appearance.

FIG. 7(d) illustrates the inflatable member (not shown), being sewn without removing leftover fabric 75 such that the uniform thickness of the folded inflatable member 11 in the longitudinal direction can be achieved. Specifically, it is preferable that the thickness of the shoulder belt at the first cover member 212 is the same as the thickness of the shoulder belt at the second cover member 312 when the inflatable member is folded. As an alternative, instead of the leftover fabric 75 of the inflatable member, a sponge or other material can be used adjacent the inflatable member to create the uniform thickness. The non-uniform perimeter 76 of a sewn inflatable member (or airbag) may create an imbalanced or uneven material thickness when the inflatable member is positioned within the air belt. As a result, leftover fabric 75 or additional material (sponge material or the like) may be included adjacent the folded airbag to create a more uniform perimeter 77. Furthermore, if a heat shielding cloth is used to protect the fabric from scorching due to the inflator during deployment, the heat shielding cloth can be elongated and be used as a substitute for fabric 75 to create a more uniform perimeter.

Figure 9:
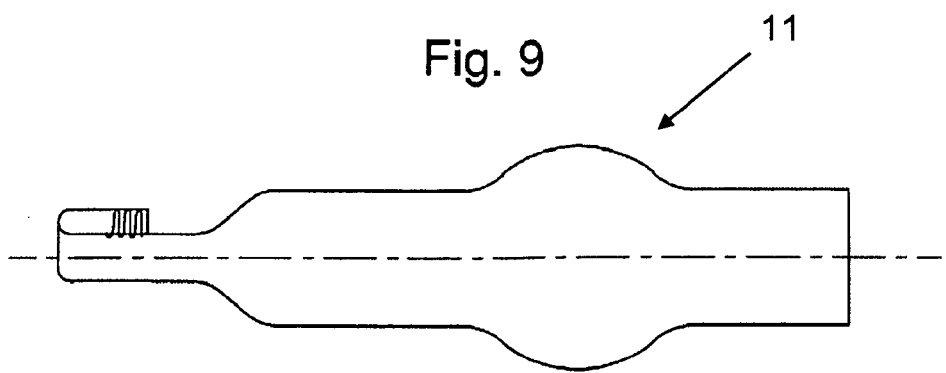
FIG. 9 is a structural view of the inflatable member incorporating a mesh webbing according to an embodiment of the present invention.

FIG. 9 illustrates the inflatable member 11 enclosed with a mesh webbing according to an embodiment of the present invention. As stated previously, the mesh webbing is supplied with the first cover member 212 and the second cover member 312. According to an alternative embodiment of the present invention, a mesh webbing is provided for the entire length of the inflatable member 11. The coarse density of the mesh webbing may be adjusted along its length depending on the diameter of the inflatable member 11 and the strength of the sewn portions of the inflatable member 11 to be required for deployment of the air belt 12b. By way of example only, and not a limitation, it is contemplated that the coarse density should be small enough to improve the strength of the sewn portions.

Figure 10A:
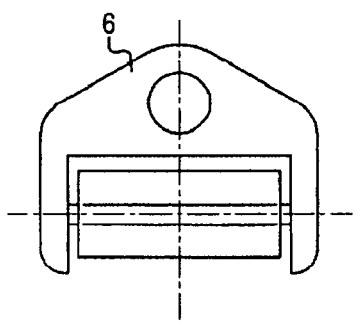
FIGS. 10(a)-10(c) are structural views of a conventional anchor and air belt provided around the anchor.
Figure 10B:
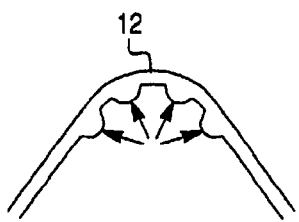
Figure 10C:
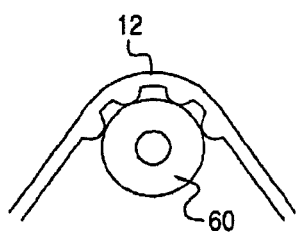
Figure 11A:
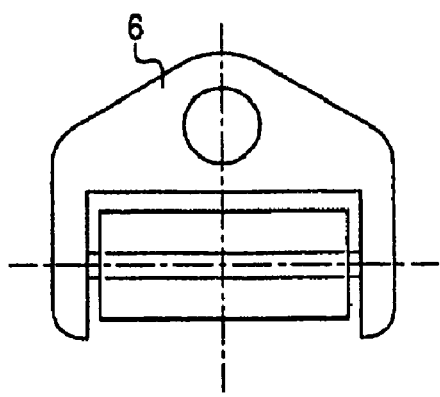
FIGS. 11(a) and 11(b) are structural views of an anchor and an air belt provided around the anchor according to an embodiment of the present invention and FIG. 11(c) is a cross-sectional view of the anchor according to an embodiment of the present invention.
Figure 11B:
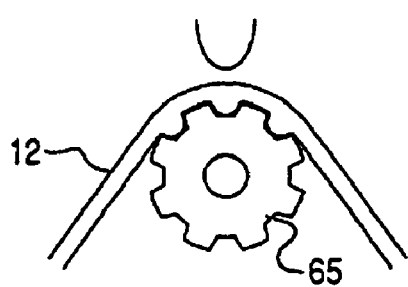
Figure 11C:
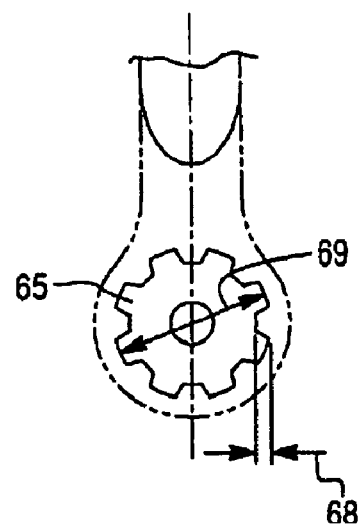

FIGS. 10(a)-10(c) are structural views of a conventional anchor and air belt provided around the anchor and FIGS. 11(a) and 11(b) are structural views of a through-anchor 6 and an air belt 12b provided around the through-anchor 6 according to an embodiment of the present invention. FIG. 11(c) is a cross-sectional view of the through-anchor 6 according to an embodiment of the present invention. As illustrated in FIG. 10(c), the conventional anchor includes a roller 60 without grooves. When the air belt 12b is bent around a roller 60, slacks or crinkles are formed as shown by the arrows in FIG. 10(b). Without grooves, the air belt 12 jams and reduces the retracting force.

According to an embodiment of the present invention, the through-anchor 6 includes a roller 65 provided around its periphery with grooves. As illustrated in the cross-sectional view of FIG. 11(c), the diameter of the roller 65 represented by reference number 69 can be at least 15 mm, for example, and the depth of the grooves represented by the reference number 68 can be more than 1 mm, for example. With this arrangement, retracting is performed in an easy and smooth manner.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air belt device, comprising:
   a webbing, and
   an inflatable member with an asymmetrical shape having two ends,
   wherein a longitudinal axis of a first end portion of the inflatable member is aligned at a non-zero angle to a longitudinal axis of a second end portion of the inflatable member when the inflatable member is in an inflated state,
   wherein the inflatable member is folded in an un-inflated state such that the longitudinal axis of the first end portion is aligned with the longitudinal axis of the second end portion.

2. The air belt device according to claim 1, further comprising a first cover member that covers the inflatable member.

3. The air belt device according to claim 2, wherein the first cover member and the inflatable member are connected.

4. The air belt device according to claim 2, wherein the first cover member comprises a mesh webbing.

5. The air belt device according to claim 4, wherein the inflatable member is located within the mesh webbing.

6. The air belt device according to claim 2, wherein the first cover member comprises tear seams, wherein the tear seams are configured to rupture when the inflatable member inflates.

7. The air belt device according to claim 2, further comprising a second cover member.

8. The air belt device according to claim 7, wherein the first cover member and second cover member are connected.

9. The air belt device according to claim 1, wherein the webbing is connected to a retractor.

10. The air belt device according to claim 1, wherein the webbing is connected to a tongue.

11. The air belt device according to claim 1, further comprising a gas generator for supplying gas into the inflatable member to inflate the air belt device.

12. An air belt device, comprising:
    a webbing, and
    an inflatable member, wherein the inflatable member comprises an inflatable region and a non-inflatable region,
    wherein the inflatable region has a non-uniform width along a length of the inflatable member when the inflatable member is in an inflated state, wherein a total width of the inflatable member provided by the inflatable region and the non-inflatable region is uniform along the length of the inflatable member when the inflatable member is in the inflated state, the air belt device further comprising a cover, wherein the non-inflatable region extends outside to an exterior of the cover when the air belt device is in a non-inflated state wherein at least one edge of the inflatable member comprises a sponge material.

13. The air belt device according to claim 12, wherein the non-inflatable region comprises additional fabric, wherein the additional fabric is located adjacent to the non-uniform width of the inflatable region to provide the uniform total width along the length of the inflatable member.

14. An air belt device, comprising:

a webbing, an inflatable member, wherein the inflatable member includes a peripheral seam that forms an inflatable region of the inflatable member, and a cover member forming an interior cavity, wherein inflatable member is folded within the interior cavity in an un-inflated state such that the peripheral seam is located substantially on a longitudinal center line of the cover member.

15. The air belt device according to claim 14, wherein, before deployment of the inflatable member, the inflatable member is folded such that a width of the inflatable member is shorter than a width of a first portion of the webbing.

16. The air belt device according to claim 15, further comprising a shoulder anchor, wherein a second portion of the webbing is configured to smoothly pass through the shoulder anchor.

17. The air belt device according to claim 16, wherein the cover member houses at least a portion of the webbing, wherein the cover member comprises a first cover member and a second cover member, wherein the first cover member covers the first portion of the webbing and the second cover member covers the second portion of the webbing.

18. The air belt device according to claim 14, wherein the cover member comprises a first cover member that covers the inflatable member.

* * * * *